C. E. AKELEY.
FILM BOX FOR MOTION PICTURE CAMERAS.
APPLICATION FILED NOV. 11, 1916.

1,242,894.

Patented Oct. 9, 1917.
2 SHEETS—SHEET 1.

Inventor
Carl E Akeley
by Percy B Hills
Attorney

C. E. AKELEY.
FILM BOX FOR MOTION PICTURE CAMERAS.
APPLICATION FILED NOV. 11, 1916.
1,242,894.
Patented Oct. 9, 1917.
2 SHEETS—SHEET 2.
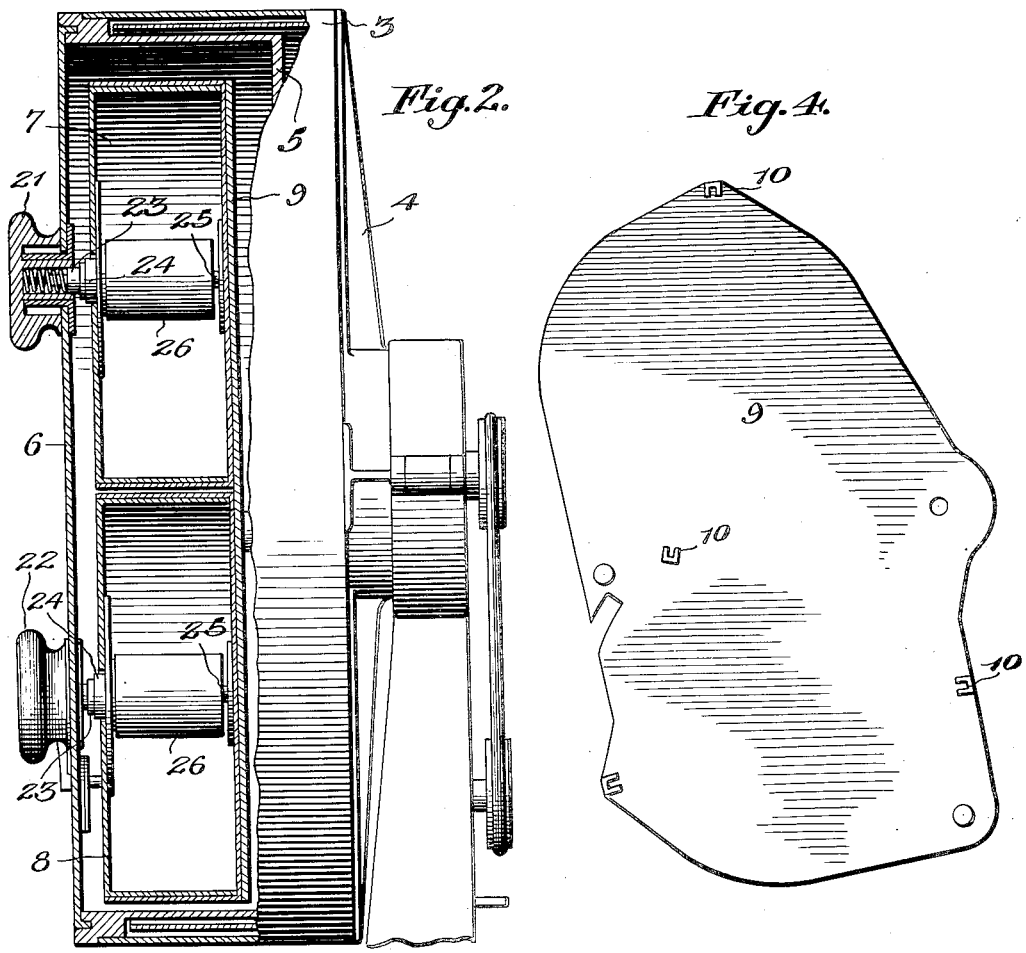
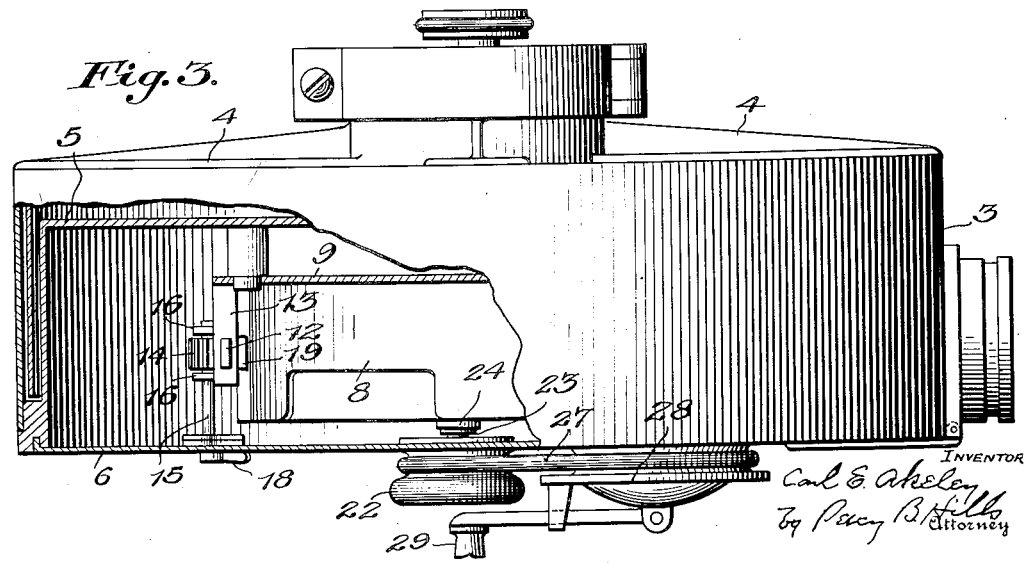

UNITED STATES PATENT OFFICE.

CARL E. AKELEY, OF NEW YORK, N. Y., ASSIGNOR TO AKELEY CAMERA, INC., OF NEW YORK, N. Y., A CORPORATION OF NEW YORK.

FILM-BOX FOR MOTION-PICTURE CAMERAS.

1,242,894.  Specification of Letters Patent.  Patented Oct. 9, 1917.

Original application filed May 8, 1916, Serial No. 96,197. Divided and this application filed November 11, 1916. Serial No. 130,789.

*To all whom it may concern:*

Be it known that I, CARL E. AKELEY, a citizen of the United States, residing at New York, in the borough of Manhattan and State of New York, have invented certain new and useful Improvements in Film-Boxes for Motion-Picture Cameras, of which the following is a specification.

My invention relates to film boxes for motion picture cameras, particularly intended for use in that general type of camera disclosed in Letters Patent No. 1,181,201, granted to my assignee May 2, 1916, and is a division of an application for motion picture cameras, filed by me May 8, 1916, Serial No. 96,197.

My invention has for its object to provide certain improvements in the construction and operation of such film boxes, as will be hereinafter more definitely pointed out and claimed, reference being had to the accompanying drawings, in which:—

Fig. 2 is a view taken at a right angle to Fig. 1, the same being partly in central vertical transverse section.

Fig. 3 is a top plan view of the camera, the same being shown partly broken away.

Fig. 4 is a detail side elevation of the plate supporting the film boxes.

Similar numerals of reference denote corresponding parts in the several views.

Figure 1:
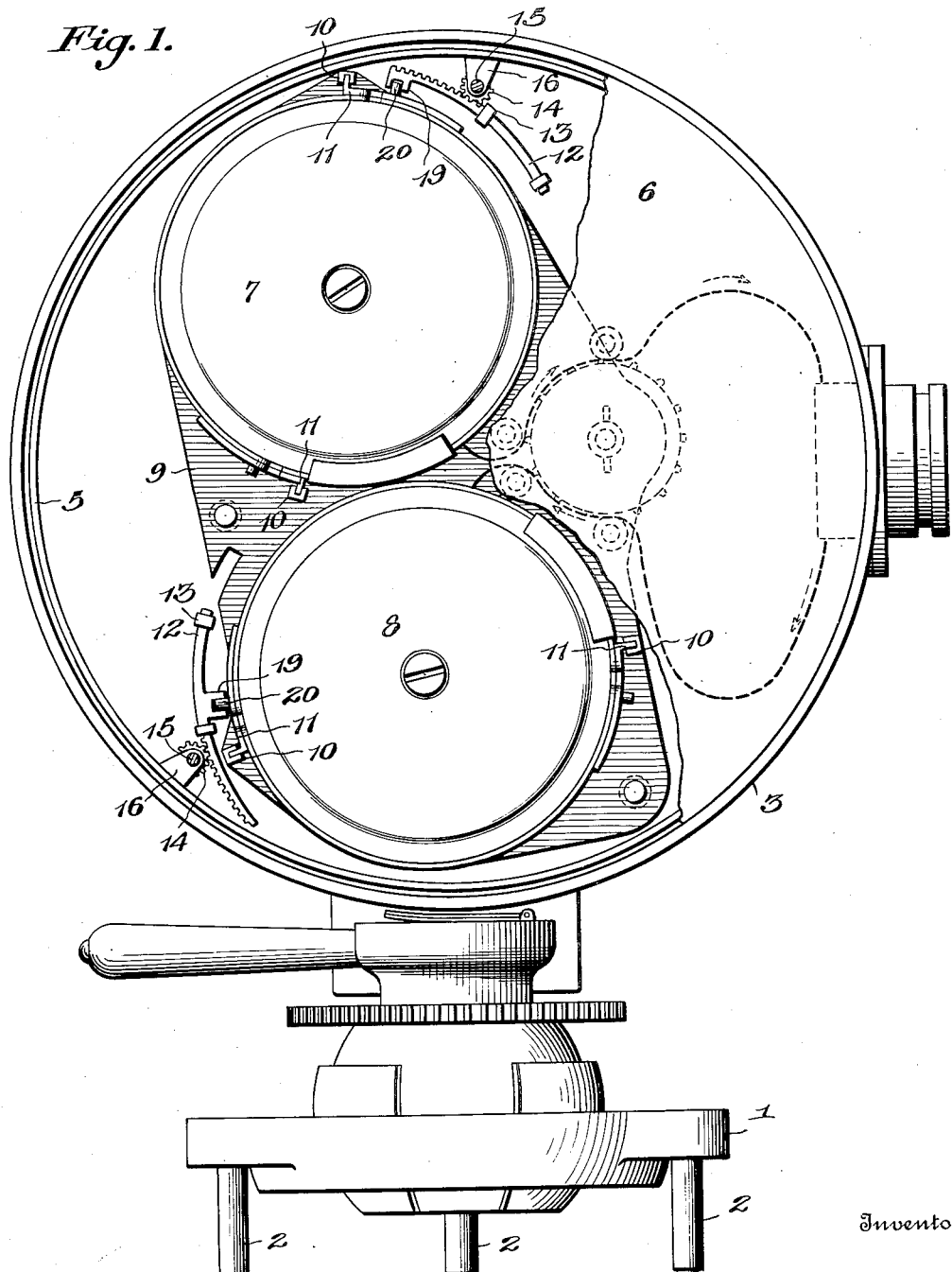
Figure 1 is a side elevation of a camera and its base, partially broken away showing my improved film boxes in position thereon.
Figure 5:
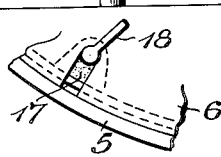
Fig. 5 is a detail view of a portion of the camera casing showing means for operating the film box opening and closing mechanism.

In the said drawings, the reference numeral 1 denotes the base supported by suitable legs 2, and carrying a camera casing 3 mounted thereon in any suitable manner, such, for instance, as in the manner disclosed in my application for Letters Patent No. 96,197 hereinbefore referred to. The details of the camera and its base or support other than those relating to the film boxes forming no part of the present invention will not be disclosed herein more fully.

The camera casing 3, which is supported by a spider 4, has an inner cylindrical box 5 spaced therefrom, said casing being closed by a removable front plate 6. Mounted in the cylindrical box 5 is a feeding film box 7 and a receiving film box 8, the same being of the construction disclosed in an application for Letters Patent filed by me April 27, 1916, Serial No. 93,928, and here need no further detail description.

Fixed in the interior of the cylindrical box 5 is a flat plate 9, shown in detail in Fig. 4, said plate having formed upon its outer face grooved sockets 10 adapted to receive the outturned portions 11 of the plates bolted to the exterior of the film boxes 7 and 8 removably to retain the latter in their proper adjusted positions. And in order to rotate the outer casings of said film boxes to the open or to the closed positions without removing the same from the cylindrical box 5 and without removing the front plate 6, I provide toothed segments 12, one for each film box, said segments being slidable longitudinally in suitable bearings 13 mounted on the plate 9. Said toothed segments are in constant mesh with gear wheels 14 whose shafts 15 are mounted in suitable bearings 16, said shafts projecting through slots 17 in the front plate 6 and being bent into operating handles 18 on the outside thereof, whereby said gears 14 may be rotated and in turn thereby shift said segments 12 longitudinally. Said segments 12 have slotted projections 19 adapted to engage the pins 20 of the film boxes 7 and 8, whereby one telescoping member of each film box may be shifted with respect to the other member to open or close the film slot therein in a manner readily understood by reference to my application No. 93,928, hereinbefore referred to.

Mounted in the front plate 6 of the camera are two knobs 21 and 22, one for each of the film boxes 7 and 8, said knobs having spring pressed elements 23 engaging the slotted nuts 24 of the film boxes, whereby a rotation of either of said knobs 21 or 22 will be imparted to the shaft 25 of its film box, and in turn to the spool 26 thereon carrying the film. By reference to Fig. 3 it will be seen that a belt 27 connects the lower knob 22 with a sheave 28, which is rotated by the rotation of a handle 29, so that the motion of said sheave is imparted to said knob 22 and in turn is imparted to the film spool 26 of the lower or film receiving box 8, which will wind the film thereon in the usual manner.

In Fig. 1, which shows the contents of the camera casing 3 in elevation, the film 27 is shown, its direction of movement being indicated by the arrows, said film leaving the feed box 7 near the bottom of the latter, passing thence over the film drive mechanism (not shown), and on its return passing into the film receiving box 8, where it is wound upon the spool 26 therein by reason of the drive of said spool through the belt 27 and knob 22, in a manner hereinbefore described.

Having thus described my invention, what I claim as new and desire to secure by Letters Patent, is:—

1. In a motion picture camera, a camera casing, a film box mounted in said casing and formed of telescoping sections adapted to rotate one upon another to open or close the film slots therein, and means permanently mounted in said casing and adapted automatically to engage the periphery of one of said sections when the film box is inserted, whereby said section may be shifted with respect to its complemental section to open or close said film slots.

2. In a motion picture camera, a camera casing, a film box mounted in said casing and formed of telescoping sections adapted to rotate one upon another to open or close the film slots therein, a projection on the periphery of the outer one of said sections, and means extending to the interior of the casing and adapted to be engaged automatically by said projection as the film box is positioned within said casing, said means when actuated rotating said section to open or close the film slots.

3. In a motion picture camera, a camera casing, feeding and receiving film boxes mounted in said casing, said film boxes being formed of telescoping sections adapted to rotate upon one another to open or close the film slots therein, toothed segments adapted to engage projections on one of the telescoping members of said film boxes, and gears operated from the exterior of the camera casing for moving said segments and thus shifting the sections of the film boxes to open or close their film slots.

In testimony whereof, I have hereunto set my hand this 1st day of November, 1916.

CARL E. AKELEY.